(12) United States Patent
Carroll et al.

(10) Patent No.: US 7,530,297 B2
(45) Date of Patent: May 12, 2009

(54) REMOTELY ACTUATED BEVELING SYSTEMS FOR A MITER SAW

(75) Inventors: Craig Allen Carroll, Bells, TN (US); Brent Edward Stafford, McLemoresville, TN (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 11/540,515

(22) Filed: Oct. 2, 2006

(65) Prior Publication Data

US 2007/0022853 A1 Feb. 1, 2007

Related U.S. Application Data

(62) Division of application No. 10/211,593, filed on Aug. 5, 2002, now Pat. No. 7,127,977.

(60) Provisional application No. 60/354,942, filed on Feb. 11, 2002.

(51) Int. Cl.
*B23D 45/04* (2006.01)
*B26D 5/08* (2006.01)

(52) U.S. Cl. .................. 83/471.3; 83/473; 83/477.1; 83/490; 83/581

(58) Field of Classification Search ............. 83/471.3, 83/477.1, 581, 473, 490, 34, 471, 471.2, 83/472, 477, 486.1, 698.41
See application file for complete search history.

(56) References Cited

U.S. PATENT DOCUMENTS

| 3,011,531 | A | * | 12/1961 | Gaskell | 83/438 |
| 4,011,782 | A | * | 3/1977 | Clark et al. | 83/471.3 |
| 5,063,805 | A | * | 11/1991 | Brundage | 83/468.3 |
| 5,249,496 | A | * | 10/1993 | Hirsch et al. | 83/471.3 |
| 5,319,992 | A | * | 6/1994 | Shui-Te | 74/543 |
| 6,101,914 | A | * | 8/2000 | Brunson et al. | 83/581 |
| 6,474,206 | B1 | * | 11/2002 | Brunson | 83/471.3 |
| 6,532,853 | B1 | * | 3/2003 | Kakimoto et al. | 83/698.11 |
| 6,658,977 | B2 | * | 12/2003 | Chang | 83/490 |
| 2003/0110914 | A1 | * | 6/2003 | Brazell et al. | 83/471.3 |

* cited by examiner

*Primary Examiner*—Ghassem Alie
(74) *Attorney, Agent, or Firm*—Hunton & Williams LLP

(57) ABSTRACT

A miter saw has a remotely actuated bevel angle locking system and a bevel angle adjustment assistance system with a remote override actuator so that the user does not need to reach around to the back of the miter saw to adjust the bevel angle. The remote actuator for the bevel angle locking system can be provided on the front of the miter saw's turntable to form a suite of actuators with the miter lock and miter detent override lever. The remote override actuator for the bevel angle adjustment assistance system can be provided on the handle in proximity to the power switch. Also disclosed is a bevel angle adjustment assistance system in which each of the preset bevel angles can be fine tuned simultaneously and which exhibits other advantages.

9 Claims, 8 Drawing Sheets

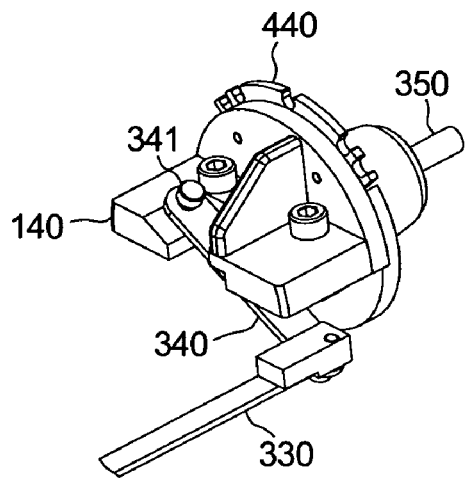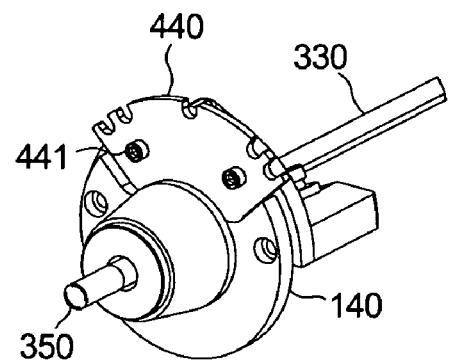
FIG. 9  FIG. 10
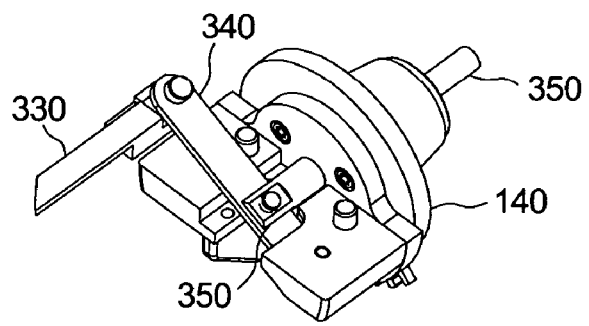
FIG. 11

REMOTELY ACTUATED BEVELING SYSTEMS FOR A MITER SAW

PRIORITY DATA

This application is a Divisional of U.S. patent application Ser. No. 10/211,593 filed on Aug. 5, 2002, now U.S. Pat. No. 7,127,977 which claims priority to U.S. Provisional Application No. 60/354,942 filed on Feb. 11, 2002. The entire contents of these applications are incorporated herein by reference.

BACKGROUND OF THE INVENTION

The field of this invention is miter saws. In a compound miter saw, the miter angle and bevel angle of the saw blade can be adjusted independent of one another, or simultaneously to make compound angle cuts. Rotating the saw blade about a vertical miter axis adjusts the miter angle. The complement of the included angle that the saw blade makes with the miter saw's fence customarily represents the miter angle. Typically, a turntable is rotatably mounted on the miter saw's base to permit the miter angle adjustment.

Rotating the saw blade about a horizontal beveling axis adjusts the bevel angle. The beveling axis preferably lies in approximately the same plane as the top of the miter saw's base. The complement of the included angle that the saw blade makes with the top of the miter saw's base customarily represents the bevel angle. Many different arrangements have been devised for rotatably mounting a saw unit to the miter saw's base to permit adjustment of the bevel angle.

The saw unit which drives the saw blade also pivots about another horizontal axis which is perpendicular to the beveling axis to plunge the saw blade into a workpiece on the miter saw's base. Additional adjustments to the position of the saw unit relative to the base are also possible. These include sliding miter saws which permit the saw unit to translate horizontally along a plane parallel with the base's top surface while cutting.

This invention is concerned with improvements to miter saws which permit a bevel angle adjustment, thus including all compound miter saws. Miter saws which permit a bevel angle adjustment require a system for locking the saw unit at a desired bevel angle. The bevel angle must be locked to hold the desired bevel angle while making a cut. Also, often the same bevel angle is needed to make several cuts and locking the bevel angle ensures repeatability.

The system for locking the bevel angle is typically actuated by reaching around to the back of the miter saw and, for example, turning a locking handle. Reaching around to the back of the miter saw can be awkward, especially on large miter saws. Beveling the miter saw from −45° to +45° might require the user to reach around with his right hand to unlock the bevel angle locking system, use his left hand to rotate the saw unit from the −45° bevel angle to the 0° bevel angle, switch the saw unit to his right hand, use his right hand to rotate the saw unit from the 0° bevel angle to the +45° bevel angle, then use his left hand to reach around the miter saw to lock the bevel angle locking system. As can be seen, having to reach around the miter saw to actuate the bevel angle locking system is an inefficient and awkward arrangement. Some tasks performed with a miter saw, for example cutting crown molding, require the user to frequently change the miter saw's bevel angle from a negative to a positive bevel angle and back again. During such tasks, the difficulty in reaching around the back of the miter saw to lock the bevel angle locking system is particularly acute.

Saws which permit a bevel angle adjustment sometimes include a system for assisting the user in beveling the saw unit to certain commonly used bevel angles. For example, users commonly make cuts with bevel angles of 0°, ±45° and ±33.86°. These bevel angle adjustment assistance systems typically operate by assisting the user to tactilely recognize when the saw blade has reached a preset bevel angle, and may also assist the user in holding the saw unit at the preset bevel angle until the bevel angle can be locked. Some bevel angle adjustment assistance systems may include an override feature for overriding the assistance provided by the system. Depending upon the characteristics of the bevel angle adjustment assistance system, overriding might be necessary to bevel the saw unit beyond certain preset bevel angles.

The actuator for overriding the bevel angle adjustment assistance system is typically actuated by reaching around to the back of the miter saw and, for example, pressing a button or pulling or pushing on a rod or lever, etc. This can be awkward, especially if the miter saw is relatively large or the actuator is not placed in an easy to reach location.

The bevel angle adjustment assistance system might allow for fine tuning the preset bevel angles so that they precisely correspond to their respective intended bevel angles. These bevel angle adjustment assistance systems have required each preset bevel angle to be separately fine tuned to the intended bevel angle. If the manufacturer is to initially fine tune each of the preset bevel angles as part of the manufacturing assembly process, the multiple separate adjustments which are required can be laborious and as a result quite expensive for the manufacturer. This cost can be especially significant when there are three or more preset bevel angles. Also, the preset bevel angles may, on a relatively infrequent basis, need to be fine tuned by the user. The required multiple separate adjustments for fine tuning the preset bevel angles can be burdensome for the user, too.

SUMMARY OF THE INVENTION

This invention seeks to alleviate the awkwardness and inconvenience of having to reach around to the back of a miter saw to actuate the bevel angle locking system. This invention also seeks to alleviate the awkwardness and inconvenience of having to reach around to the back of a miter saw to override the bevel angle adjustment assistance system. This invention also proposes an effective and efficient bevel angle adjustment assistance system where each of the several preset bevel angles can be fine tuned in one operation.

In one embodiment, a miter saw comprises a base assembly, a saw unit having a saw blade, and a saw support assembly rotatably mounted to the base assembly, the saw support assembly supporting the saw unit and pivoting the saw unit to plunge the saw blade into a workpiece laying on the base assembly, the saw support assembly rotating relative to the base assembly to adjust the bevel angle of the saw blade. A pin has a first end anchored to the saw support assembly and extends from the first end toward the base assembly. The miter saw further comprises a remote actuator for locking together and preventing relative rotation between the saw support assembly and the turntable, the remote actuator is operatively connected to the pin at a position opposite the first end. When the remote actuator is actuated the pin is tensioned, the tensioned pin pulling the saw support assembly towards the base assembly to help prevent relative rotation of the saw support assembly and the turntable.

In another embodiment, a method of adjusting and locking the bevel angle of a miter saw comprises the steps of rotating a saw support assembly mounting a saw unit to a desired bevel angle, tensioning a pin which extends between the saw support assembly and a base assembly by pulling the pin in the direction of the base assembly, and using the tension in the pin to create compressive force between the saw support assembly and the base assembly, the compressive force resulting in friction which helps prevent the saw support assembly from rotating relative to the base assembly.

In another embodiment, a miter saw comprises a base, a turntable rotatably supported by the base, a saw unit having a saw blade, and a saw support assembly rotatably mounted to the turntable, the saw support assembly supporting the saw unit and pivoting the saw unit to plunge the saw blade into a workpiece laying on the turntable, the saw support assembly rotating relative to the turntable to adjust the bevel angle of the saw blade. A suite of actuators is mounted to the front of the turntable for adjusting the position of the saw unit relative to the base wherein each of the actuators is actuable by the users hand with the user's respective arm in the same general position. The suite of actuators includes a bevel angle lock actuator wherein actuation thereof causes the saw support assembly to be locked to the turntable so that the bevel angle of the saw blade cannot be adjusted, and a miter angle lock actuator wherein actuation thereof causes the turntable to be locked relative to the base so that the miter angle of the saw blade cannot be adjusted.

In another embodiment, a miter saw comprises a base, a turntable rotatably mounted on the base to turn about a vertical axis, a saw unit having a saw blade, and a saw support assembly rotatably mounted to the turntable, the saw support assembly supporting the saw unit and pivoting the saw unit to plunge the saw blade into a workpiece laying on the base assembly, the saw support assembly rotating relative to the turntable to adjust the bevel angle of the saw blade. A fence is mounted to the base and overlaps the turntable. A remote actuator for a bevel angle locking system is mounted to the turntable on a portion of the turntable forward of the fence.

In another embodiment, a miter saw comprises a base assembly, a saw unit having a saw blade, and a saw support assembly rotatably mounted to the base assembly, the saw support assembly supporting the saw unit and pivoting the saw unit to plunge the saw blade into a workpiece laying on the base assembly, the saw support assembly rotating relative to the base assembly to adjust the bevel angle of the saw blade. A pin extends between the saw support assembly and the base assembly. A lever is operatively connected to the pin wherein when the lever is pivoted, the lever pulls on the pin to tension the pin, the tensioned pin causing compressive force to be increased between the saw support assembly and the base assembly to help prevent relative rotation between the saw support assembly and the base assembly.

In another embodiment, a miter saw comprises a base assembly, a saw unit having a saw blade, and a saw support assembly rotatably mounted to the base assembly, the saw support assembly supporting the saw unit and pivoting the saw unit to plunge the saw blade into a workpiece laying on the base assembly, the saw support assembly rotating relative to the base assembly to adjust the bevel angle of the saw blade. A detent rack is mounted to one of the base assembly or the saw support assembly, the detent rack having a plurality of detents formed thereon corresponding to preset saw blade bevel angles. A detent finder is mounted to the other of the base assembly or the saw support assembly, the detent finder being engageable and disengageable with each of the detents formed in the detent rack. The mounting position of at least one of the detent rack or the detent finder can be adjusted to simultaneously fine tune each of the preset saw blade bevel angles.

In another embodiment, a method of fine tuning preset bevel angles in a bevel angle adjustment assistance system for a miter saw, the system assists a user in adjusting the bevel angle of the saw blade to one of a plurality of commonly used bevel angles, and the bevel angle adjustment assistance system has a plurality of preset bevel angles, each of the preset bevel angles corresponding to an intended, commonly used bevel angle. The method comprises the steps of setting the true bevel angle of the saw blade to 0°, retaining the position of the saw blade, and adjusting the mounting position of a single element of the bevel angle adjustment assistance system to fine tune the preset bevel angle which corresponds to 0° to the current bevel position of the saw blade, such adjustment simultaneously fine tuning each of the remaining preset bevel angles.

In another embodiment, a miter saw comprises a base assembly, a saw unit having a saw blade, and a saw support assembly rotatably mounted to the base assembly, the saw support assembly supporting the saw unit and pivoting the saw unit to plunge the saw blade into a workpiece laying on the base assembly, the saw support assembly rotating relative to the base assembly to adjust the bevel angle of the saw blade. At least one stop surface is formed on one of the base assembly or the saw support assembly and a stopping member is mounted to the other of the base assembly or the saw support assembly, wherein the stopping member is engageable and disengageable with the at least one stop surface. A flexible cable is operatively connected at a first end thereof to the stopping member, the flexible cable being adapted to move the stopping member to engage and disengage the at least one stop surface.

In another embodiment, a miter saw comprises a handle graspable by the user when pivoting a saw unit toward a base assembly to plunge a saw blade into a workpiece laying on the base assembly, a power switch mounted on the handle for actuating a motor of the saw unit, and an override actuator mounted on the handle. When the override actuator is actuated, a bevel angle adjustment assistance system is overridden so that the system provides at least diminished assistance in setting the saw unit at a preset bevel angle and the saw unit can be beveled beyond a preset bevel angle to another bevel angle.

In another embodiment, a miter saw comprises a base assembly, a saw unit having a saw blade, and a saw support assembly rotatably mounted to the base assembly, the saw support assembly supporting the saw unit and pivoting the saw unit to plunge the saw blade into a workpiece laying on the base assembly, the saw support assembly rotating relative to the base assembly to adjust the bevel angle of the saw blade. A detent rack is mounted to one of the base assembly or the saw support assembly, and the detent rack has a plurality of detents each corresponding to a preset bevel angle, the plurality of detents arranged in a radial pattern around the axis of rotation of the saw support assembly relative to the base assembly. A detent finder is mounted to the other of the base assembly or the saw support assembly, the detent finder being engageable and disengageable with each of the detents formed on the detent rack, and the detent finder being biased toward its engaged position.

BRIEF DESCRIPTION OF THE DRAWINGS

FIGS. 9-11 are isometric assembly views of some of the components of the bevel angle locking system shown in FIG. 2.

DETAILED DESCRIPTION OF THE PREFERRED EMBODIMENTS

The preferred embodiments of this invention are directed to, among other things, a remotely actuated bevel angle locking system, a remote override actuator for a bevel angle adjustment assistance system, and a beveling detent system. The principles of the invention will be described through their application, i.e., by showing how a particular type of bevel angle locking system can be remotely actuated and how a particular type of bevel angle adjustment assistance system can be overridden with a remote actuator. However, those of ordinary skill in the design of miter saws and power tools will be able to readily apply these principles to remotely actuate other types of bevel angle locking systems and remotely override other types of bevel angle adjustment assistance systems.

Figure 1:
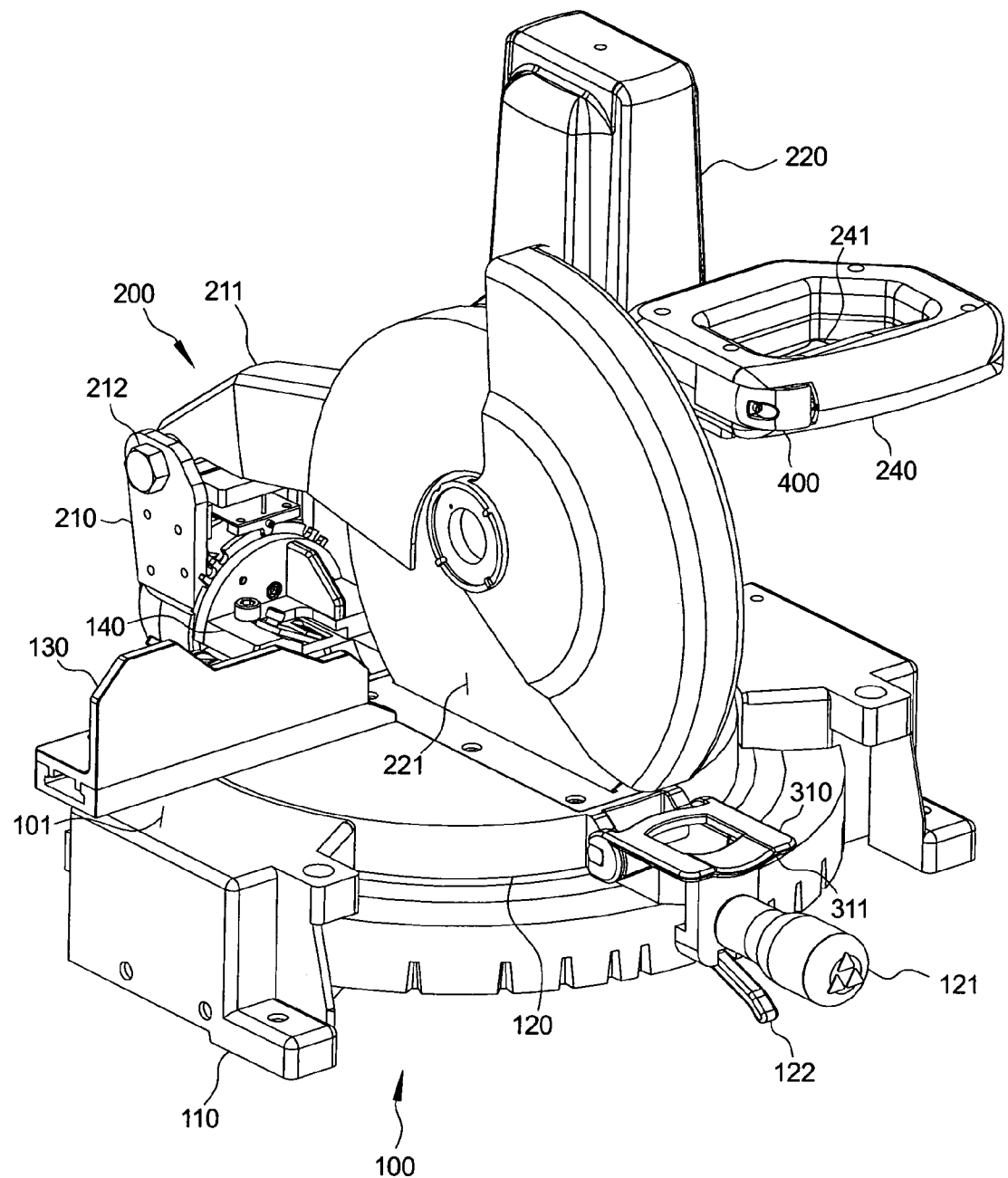
FIG. 1 is an isometric view of a miter saw having illustrative embodiments of the invention's principles.

An illustrative embodiment of one miter saw is shown in FIGS. 1-13. With reference first to FIG. 1, a base assembly 100 can include a base 110 and a turntable 120. The turntable 120 is rotatably supported by the base 110 to turn about a vertical axis. A handle 121 can be grasped by the user to rotate the turntable 120 on the base 110 to adjust the saw's miter angle. A miter lock is provided to lock the turntable 120 at a desired miter angle. The miter lock can be provided, as is known in the art, integral with the handle 121. By turning the handle 121, the turntable 120 is clamped to the base 110 using screw threads formed on the handle. A detent system may also be provided, as is known in the art, for assisting the user in adjusting the turntable 120 to commonly used miter angles. The detent system may have an override actuator 122, commonly a lever, mounted in close proximity to the handle 121.

The base assembly 100 may also include a fence assembly 130. The fence assembly 130 may be mounted to the base 110 and overlap a portion of the turntable 120, as shown in FIG. 1. A top surface 101 of the base assembly 100 and the front surface of the fence assembly 130 together support a workpiece during cutting.

A saw support assembly 200 is rotationally mounted to the base assembly 100 and supports a saw unit 220. As in the embodiment illustrated herein, the saw support assembly 200 may include a trunnion 210 and an upper arm 211 pivotally connected to one another with a pin 212. Also as in the embodiment illustrated herein, the base assembly 100 may further include a knuckle 140 mounted to the back of the turntable 120. Surfaces of the knuckle 140 and the trunnion 210 are in contact and support the saw support assembly 200 for rotational movement about a horizontal axis relative to the base assembly 100 to adjust the saw's bevel angle. The type of rotational mounting for a saw support assembly illustrated herein is well known and described in U.S. Pat. No. 5,235,889, which is hereby incorporated by reference into this application. Other arrangements for mounting the saw support assembly 200 to the base assembly 100 which permit adjustment of the bevel angle are also possible and may likewise be embraced by this principles of this invention.

The saw support assembly 200 mounts a saw unit 220 which has a motor driving a saw blade 221. The saw support assembly 200 pivots the saw unit 220 about pin 212 to plunge the saw blade 221 into a workpiece laying on the top surface 101 of the base assembly 100. The saw support assembly 200, or the base assembly 100, may also include a slide mechanism which permits the saw unit 220 to translate horizontally along an axis parallel with the top surface 101 and the saw blade 221. A handle 240 is connected to the saw support assembly 200 and is graspable by the user to control the plunging of the saw blade 221 into the workpiece. The handle 240 includes a power switch 241 for actuating the motor of the saw unit 220.

Figure 2:
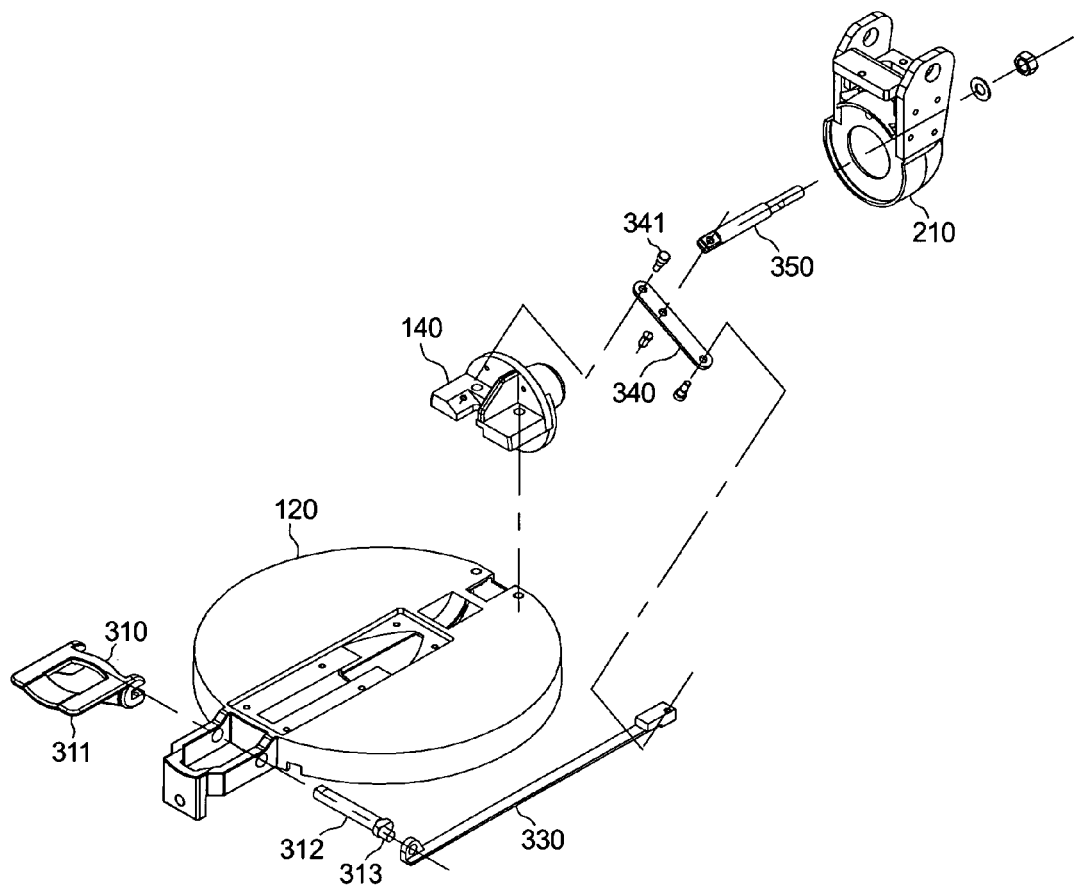
FIG. 2 is an exploded view of some of the components of the miter saw of FIG. 1, particularly the bevel angle locking system including a remote actuator mounted to the front of the miter saw turntable.
Figure 3:
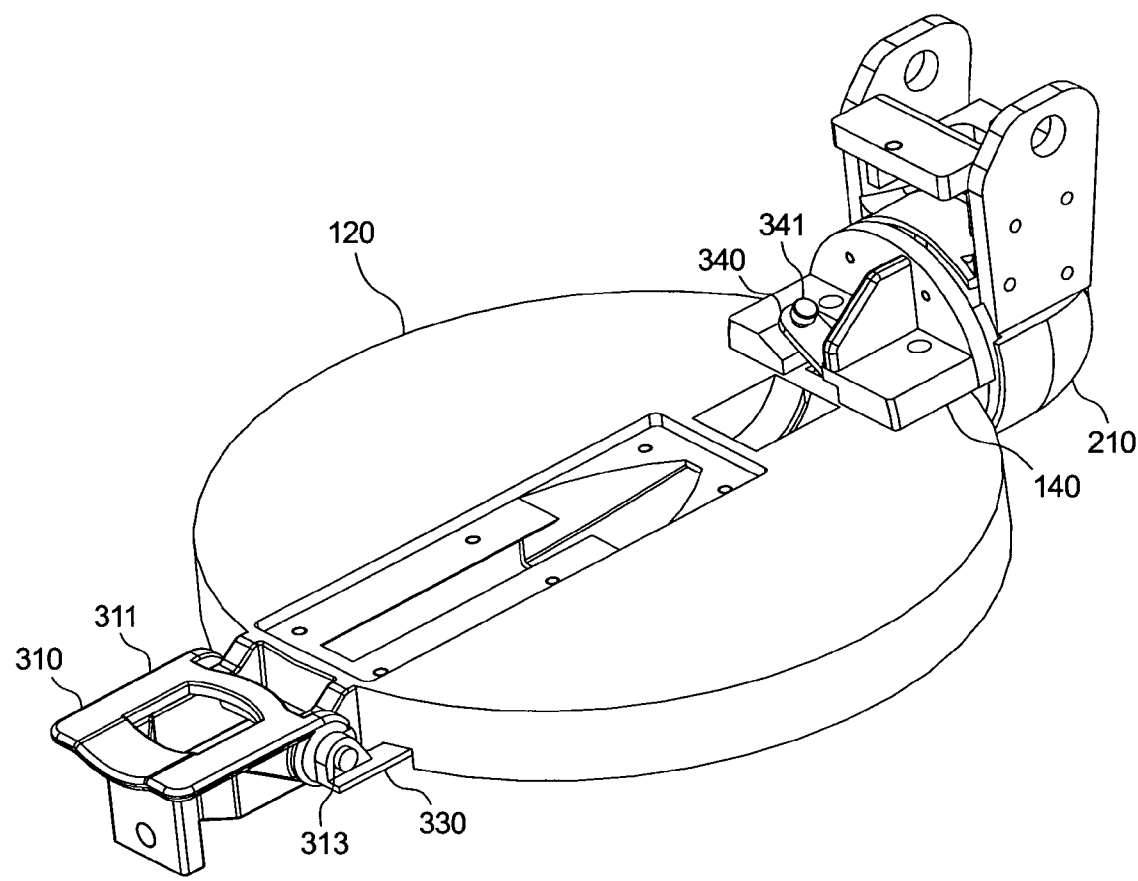
FIGS. 3-4 are assembly views of some of the components shown in FIG. 2.
Figure 4:
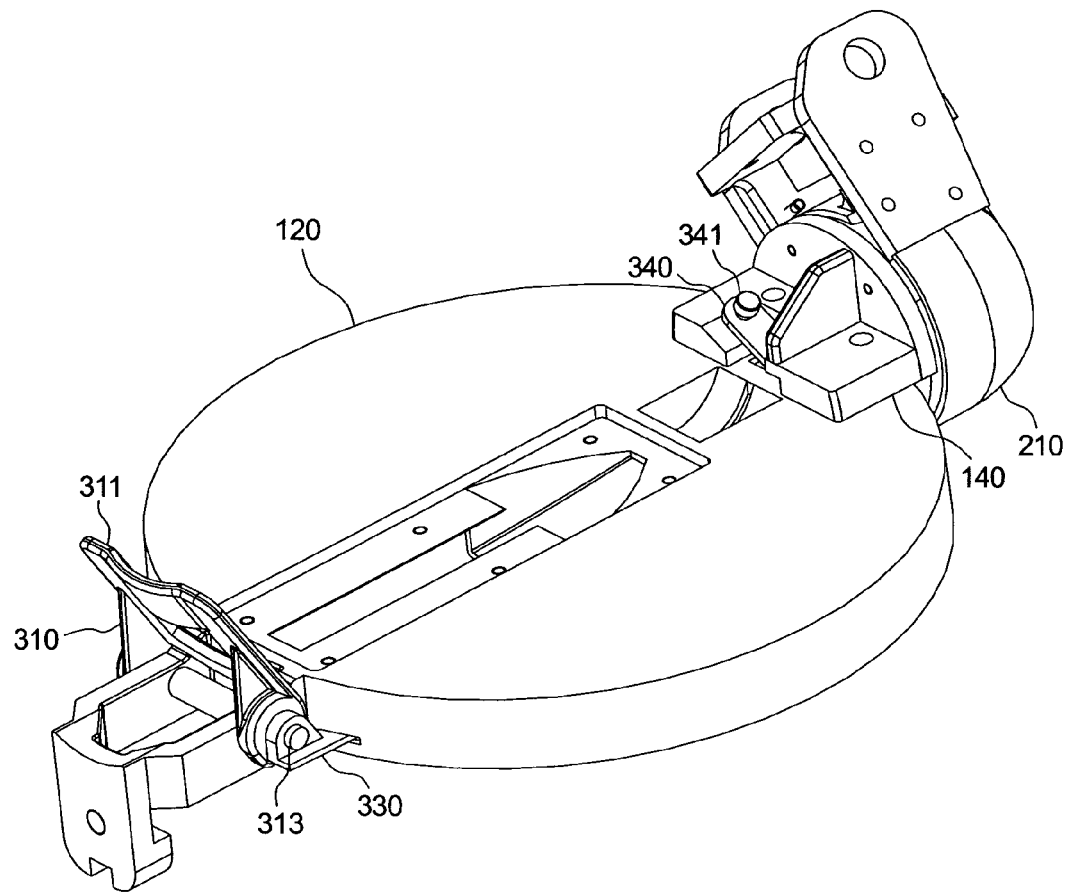
Figure 5:
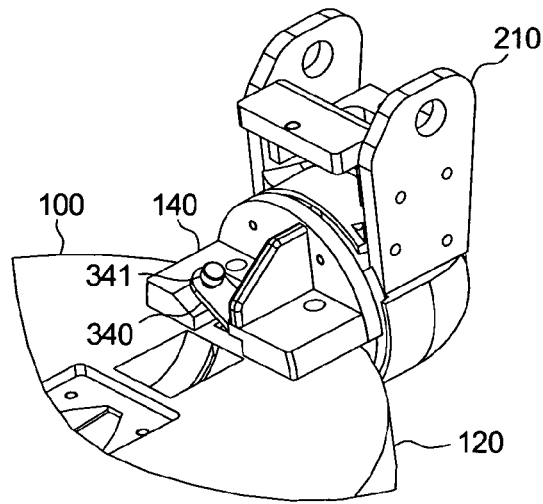
FIGS. 5-8 are isometric detail views of the miter saw of FIG. 1 showing details of the bevel angle locking system.

FIG. 2 is an exploded view of a bevel angle locking system with a remote actuator 310. FIGS. 3 and 4 are assembly views of the turntable 120 with the remote actuator 310 mounted thereto. In FIG. 3, the remote actuator 310 is shown in its locked position wherein the bevel angle locking system will lock the bevel angle. FIG. 4 shows the remote actuator 310 in its unlocked position wherein the bevel angle can be adjusted.

Preferably, the remote actuator 310 is mounted to the front of the turntable 120 and its location and movement are coordinated with other of the miter saw's actuators to form a suite of actuators. A suite of actuators means that each of the actuators in the suite can be actuated by the user's hand with the user's respective arm in the same general position. Such an arrangement is efficient for the user because it reduces the time needed to move the user's hand from one actuator to another actuator mounted at another location on the miter saw. Also, with several actuators located closely together to form a suite of actuators, the user can more quickly learn to tactilely recognize the location of the actuators because the user will be repeatedly and more frequently moving his or her hand to the location of the suite. An example of a suite of actuators in another unrelated field would be the multiple actuators built into a turn signal switch of an automobile.

Alternatively, the remote actuator 310 could be mounted at another location on the turntable 120 that is forward of the fence assembly 130. If the remote actuator 310 is mounted to the turntable 120 at a location which is always forward of the fence assembly 130, then the remote actuator 310 can be actuated without reaching around to the back of the miter saw no matter the miter angle of the saw.

To lock the bevel angle, the bevel angle locking system in the illustrated embodiment compresses together surfaces of the saw support assembly 200 and the base assembly 100 to prevent relative rotation. A pin 350 extends between the base assembly 100 and the saw support assembly 200 and is anchored at a first end thereof to the saw support assembly. In the specific embodiment illustrated herein, the pin 350 extends through the knuckle 140 and is anchored to the trunnion 210. The pin 350 can be anchored to the trunnion 210 with a locknut. Other anchoring arrangements could be used such as a cross pin passing through both the pin 350 and the trunnion 210.

The remote actuator 310 is operatively connected to the pin 350 at a location opposite the first end of the pin which is anchored to the saw support assembly 200. When the remote actuator 310 is actuated, it tensions the pin 350 by pulling the pin toward the base assembly 100. When pin 350 is tensioned, it transfers a force to the saw support assembly 200, pulling the saw support assembly towards the base assembly 100 creating a force between the saw support assembly and the base assembly. This force results in friction to lock the saw's bevel angle.

The principle of the remote actuator can be applied to other bevel angle locking systems in a similar manner. In one variation of the bevel angle locking system described above, a second pin is mounted between the base assembly and the saw support assembly along an axis parallel but spaced from the first pin and the second pin is tensioned to lock the bevel angle. This variation is shown in U.S. Pat. No. 5,425,294 and a remote actuator could be used to tension the second pin in a similar fashion. It should be reiterated that the principles of this remote actuator for a bevel angle locking system are applicable to these and other bevel angle locking systems that are not specifically illustrated herein.

Figure 6:
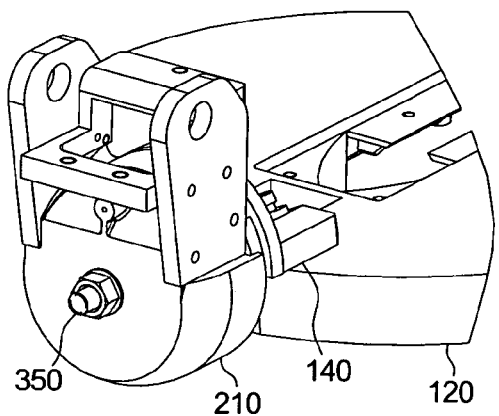
Figure 7:
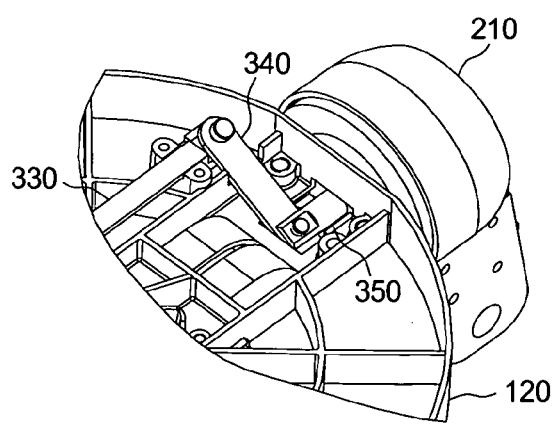
Figure 8:
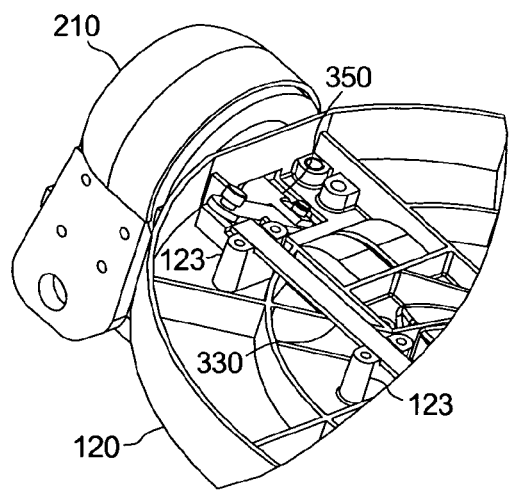

Returning to the illustrated embodiment, the remote actuator 310 is a lever 311 pivotally mounted to the turntable 120. The lever 311 includes a shaft 312 which rotates when the user pivots the lever 311. The shaft 312 has mounted on one end thereof an eccentric crank 313. When the eccentric crank 313 rotates, it pulls or pushes on a first linkage 330. If necessary, the movement of first linkage 330 can be guided by guides 123 mounted on the bottom of the turntable 120 as shown in FIG. 8. The first linkage 330 is pivotally connected to a second linkage 340. Second linkage 340 is in turn pivotally mounted to the turntable 120 via shoulder bolt 341. Also pivotally mounted to the second linkage 340 is pin 350. Various views of these components of the bevel angle locking system are shown in FIGS. 5-11.

When the user pivots the lever 311 to its locked position shown in FIG. 3, the first linkage 330 is pulled forward by the eccentric crank 313 and the second linkage 340 is thereby caused to pivot. The pivoting of the second linkage 340 causes the pin 350 also to move forward toward the base assembly 100. Because the pin 350 is anchored to the trunnion 210, when the pin 350 moves forward, the trunnion 210 in turn pushes against the knuckle 140, the force of the trunnion against the knuckle creating friction to lock the bevel angle. The lever 311 remains in the locked position shown in FIG. 3 and holds the tension in the pin 350 because the crank 313 rotates to a slightly over center position.

To release the bevel angle for adjustment, the lever 311 is pivoted by the user in the opposite direction to the position shown in FIG. 4. Crank 313 causes first linkage 330 to move rearward which in turn pivots the second linkage 340 and releases the tension in pin 350. When the tension in pin 350 has been released, the trunnion 210 and the knuckle 140 can move apart from one another and the bevel angle of the miter saw can again be adjusted.

The remote actuator may be operatively connected to the bevel angle locking system in other ways. For example, the remote actuator may include a rotary knob mounted to the front of the miter saw which turns a shaft when the knob is turned by the user. The shaft could be connected to the pin through a lead screw or worm gear or other arrangement.

Figure 12:
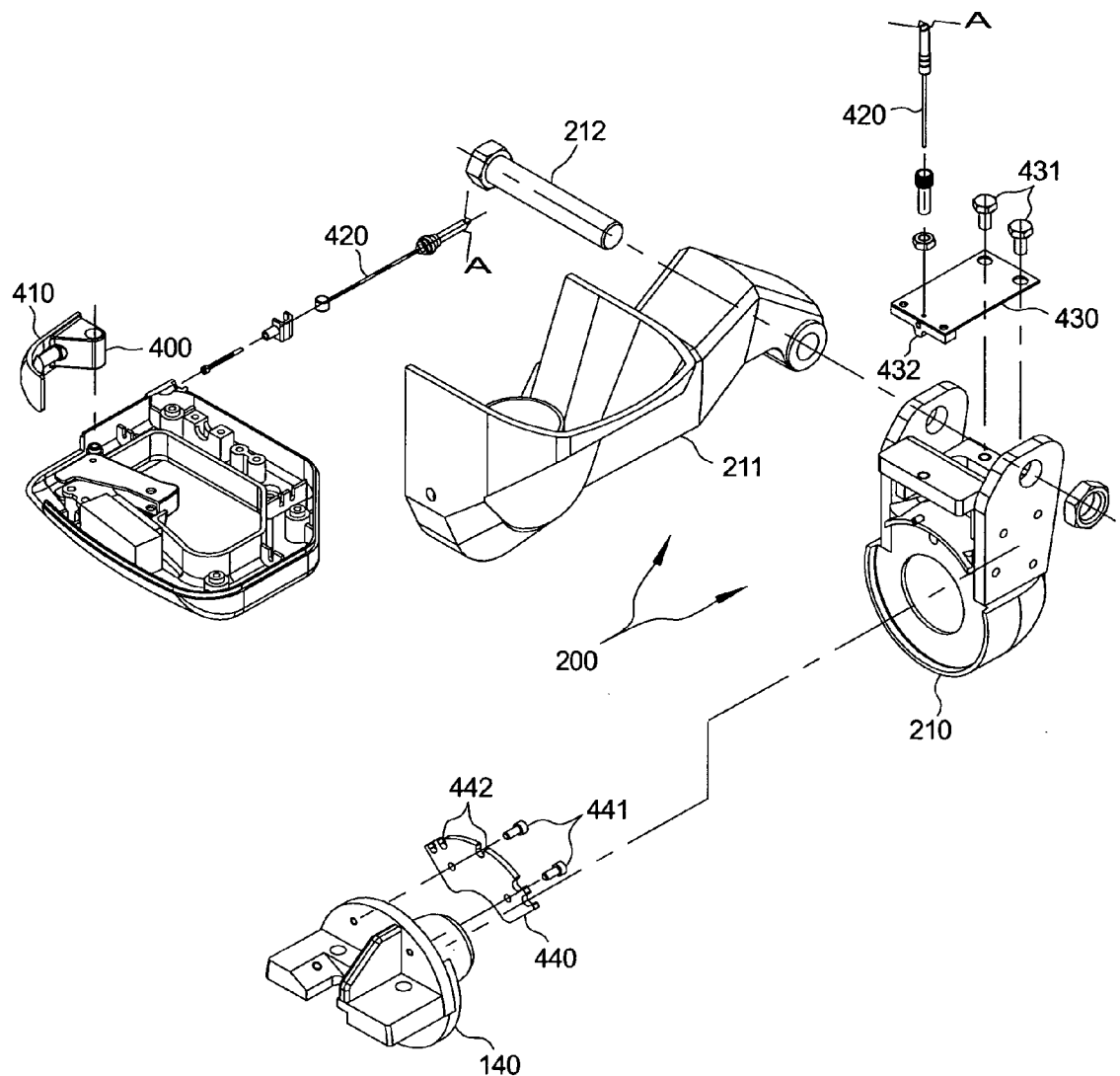
FIG. 12 is an exploded view of some of the components of the miter saw of FIG. 1, particularly the bevel angle adjustment assistance system including a remote override actuator mounted to the miter saw's handle.

FIG. 12 is an exploded view of some of the major components of the bevel angle adjustment assistance system including a remote override actuator 400. A bevel angle adjustment assistance system assists the user in tactilely recognizing when the saw blade has reached a preset bevel angle, and may also assist the user in holding the saw unit at the preset bevel angle until the bevel angle can be locked. An override feature overrides the assistance provided by the bevel angle adjustment assistance system. Depending upon the characteristics of the bevel angle adjustment assistance system, overriding might be necessary to bevel the saw unit beyond certain preset bevel angles.

This invention proposes a remotely actuated override feature. The remote override actuator 400 can be mounted to the handle 240. The remote override actuator 400 can be further located on the handle 240 so that the user can actuate the remote override actuator and the power switch 241 with the user's hand remaining in the same position. The view in FIG. 1 shows that with the user's hand in a single position, the trigger switch 241 can be actuated by several of the user's fingers while the remote override actuator 400 can be actuated by the user's thumb. The remote override actuator 400 could be mounted in other positions on the miter saw, as well.

In the illustrated embodiment the remote override actuator 400 is a lever 410 pivotally mounted to the handle 240. The motion of the lever 410 is transferred to the bevel angle adjustment assistance system to override the system through a flexible cable assembly 420.

Figure 13:
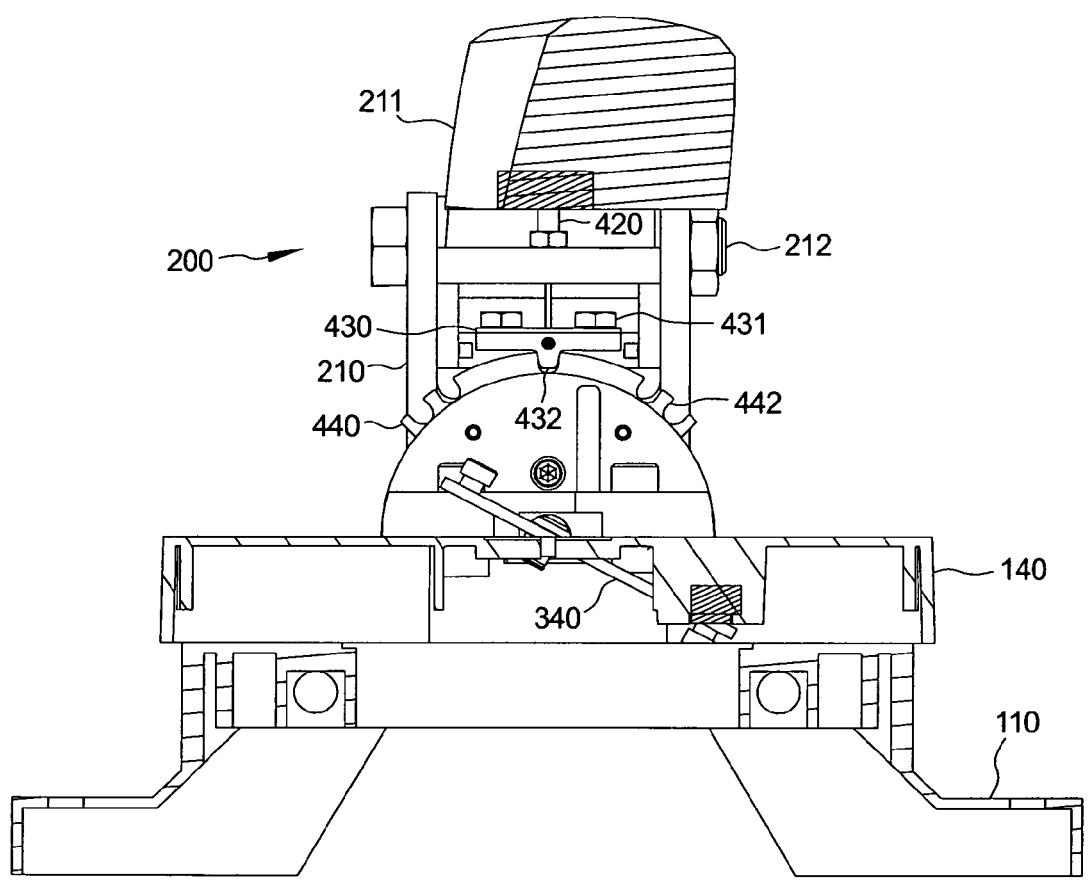
FIG. 13 is a sectional view of the miter saw of FIG. 1.

The bevel angle adjustment assistance system illustrated herein, particularly in FIGS. 12 and 13, includes a detent spring clip 430 and a detent rack 440. The detent spring clip 430 is connected to the saw support assembly 200 at the trunnion 210 with adjustment screws 431. The detent spring clip 430 is connected in a manner that allows one end thereof to remain flexible relative to the saw support assembly 200. The detent rack 440 is connected to the base assembly 100 at the knuckle 140 with adjustment screws 441. In other embodiments, the position of the detent spring clip 430 and the detent rack 440 could be reversed with the detent spring clip 430 connected to the base assembly 100 and the detent rack 440 connected to the saw support assembly 200. A detent finder 432 is mounted to the detent spring clip 430. Obviously, the detent spring clip 430 and the detent finder 432 could also be one integral component.

Detents 442 are formed on the detent rack 440. Each detent 442 corresponds to a preset bevel angle. The preset bevel angles are chosen to correspond to commonly used bevel angles such as 0°, ±45° and !33.86°. The detent spring clip 430 biases the detent finder 432 into engagement with each of the detents 442, as shown in FIG. 13. When the detent finder 432 engages with one of the detents 442, the user can hear and/or feel that the miter saw has reached the preset bevel angle. The engagement of the detent finder 432 with one of the detents 442 can also assist in holding the miter saw at the preset bevel angle until it can be locked.

The detent finder 432 can be disengaged from a detent 442 by bending the detent spring clip 430 away from the detent. This can be done with the remote override actuator 400. Actuating the lever 410 pulls on the cable in the cable assembly 420. The cable assembly 420 is attached to the flexible end of detent spring clip 430 so that when the cable is pulled, the detent spring clip 430 bends and the detent finder 432 disengages from the detent 442. Thus, the remote actuator 400 permits the bevel angle adjustment system to be overridden without having to reach around to the back of the miter saw.

This principle of a remote override actuator is not limited to the particular bevel angle adjustment assistance system illustrated herein. A remote override actuator could be provided with other systems such as those disclosed in U.S. Pat. Nos. 6,035,754 and 5,839,339. Several different embodiments of bevel angle adjustment assistance systems are illustrated in the '754 patent. In FIGS. 6 and 7 of the '754 patent, a system is illustrated which includes a stop rod 84 which has a stop position and a release position. In its stop position, stop rod 84 will engage adjustable stops 88a shown in FIG. 8 to help hold the miter saw at the respective preset bevel angle. Stop rod 84 is moved to its release position by an override button 86 shown in FIG. 6. A remote override actuator could be operatively connected with a flexible cable assembly to the stop rod 84 to move it between its stop and release positions and override the bevel angle adjustment assistance system. This principle of a remote override actuator can be similarly applied to the other embodiments illustrated in the '704 patent which include a stop rod 84 that pivots or twists, etc., to move between its stop and release positions. As can be seen from these examples, the principle of a remote override actuator is not limited to a bevel angle adjustment assistance system which includes detents—it can be used with any system which has a stopping member which engages with a stopping surface as the miter saw is beveled to a preset bevel angle, thus including detent systems.

The '339 patent also illustrates several different embodiments of bevel angle adjustment assistance systems. In FIG. 6 of the '339 patent, a system is illustrated which includes a stopper lever 53 and stopper bolts 51a and 51b. The stopper lever 53 engages the stopper bolt 51a or 51b to hold the miter saw at the preset bevel angle until the bevel angle can be locked. The stopper lever 53 pivots between the two positions shown in FIG. 6 to permit the miter saw to bevel past the stopper bolts 51a or 51b to different bevel angles. A remote override actuator could be operatively connected with a flexible cable assembly to the stopper lever 53 to move it between its two positions and override the bevel angle adjustment assistance system. FIG. 16 of the '339 patent illustrates another embodiment of a bevel angle adjustment assistance system including a stopper pin 145 mounted on a lever 150 to pivot between two positions. In one position, the stopper pin 145 will engage a stopper bolt 142. Again, a remote override actuator could be operatively connected with a flexible cable assembly to the lever 150, or to the operational knob 148, to move the stopper pin 145 between its two positions and override the bevel angle adjustment assistance system. The flexible cable assembly illustrated herein is extremely versatile and could allow a remote override actuator to override many different types of bevel angle adjustment assistance systems. Of course, other structures could be used to operatively connect a remote override actuator with a bevel angle adjustment assistance system—the invention is not limited to a remote override actuator connected through a flexible cable assembly.

Returning to the particular bevel angle adjustment assistance system illustrated herein, apart from the advantages of the remotely actuated override feature, this bevel angle adjustment assistance system provides several other advantages over prior art systems. First, multiple preset bevel angles can be easily provided by forming multiple detents on the detent rack 440. In many prior art systems it would be difficult to provide more than three preset bevel angles because of space limitations. Also, additional preset bevel angles would add to the cost of the miter saw in prior art systems because of the relatively high number of parts and machined features associated with each preset bevel angle. Here, each additional preset bevel angle requires only an additional detent formed on the detent rack 440. The detent rack 440 can be made in a stamping process which would permit very accurate placement of the detents and would facilitate including few or many detents on the rack. The radius from the beveling axis to the detents can be increased to accommodate a greater number of detents. While three bevel angles, 0° and ±45°, are the most commonly used bevel angles for miter saws, other bevel angles are also frequently used. For example, bevel angles of !33.86° are used frequently when cutting common 52/38 crown molding. If only three preset bevel angles can be effectively provided by a bevel angle adjustment assistance system, then these other frequently used bevel angles cannot be accommodated.

Second, all of the preset bevel angles can be fine tuned in a single operation by fine adjusting the position of the detent rack 440 on the knuckle 140 or by fine adjusting the position of the detent spring clip 430 on the trunnion 210. For example, with the detent finder 432 engaged with the detent 442 corresponding to the 0° bevel angle, the adjustment screws 431 can be loosened to permit fine adjusting the mounting position of the detent spring clip 430. Next the bevel angle locking system is released so that the miter saw bevel angle can be adjusted. The miter saw is then beveled so that the saw blade 221 is at an exact 0° bevel angle with respect to the top surface 101 of the base assembly 100 by using a square placed against the saw blade 221 and the top surface 101. Because the detent finder 432 remains engaged with the detent rack 440, the position of the detent spring clip 430 on the trunnion 210 will be adjusted as the miter saw is beveled. Finally, the adjustment screws 431 are retightened to fix the mounting position of the detent spring clip 430. Assuming that the detents 442 on the detent rack 440 have been formed with accurate relative radial positions, then this single operation of fine tuning the mounting position of the detent spring clip 430 will accurately fine tune all of the preset bevel angles. This feature can result in a significant convenience for the end user and cost savings for the manufacturer of the miter saw.

Third, each of the preset bevel angles can be overridden by actuating a single component, the detent finder 432. Also, the last preset bevel angles of ±45° can be overridden so that the saw unit can bevel beyond ±45°.

In addition, the detent spring clip 430 can be designed so that when the detent finder 432 is engaged in one of the detents 442, the detent finder 432 remains strongly biased against the detent rack 440. This may help to hold the miter saw at the preset bevel angle more accurately by removing some of the potential play between the detent finder 432 and the detent rack 440. Also, the detent finder 432 and the detents 442 could be wedge-shaped to help reduce the amount of play and make the preset bevel angles more accurate.

The periphery of the detent rack 440 between the detents 442 can be smoothly arc-shaped so that the detent finder 432 can be released between detents 442 and will rub against the detent rack 440 until the detent finder 432 engages the next detent 442.

The remote beveling systems for a miter saw disclosed herein will make miter saws easier to use by making bevel angle adjustments of the miter saw more efficient and simpler. The scope of protection claimed for these remote beveling systems is not limited to the specific embodiments illustrated herein. The scope of the invention shall be determined with reference to the appended claims.

We claim:

1. A miter saw comprising:
   a base assembly;
   a saw unit having a saw blade;
   a saw support assembly rotatably mounted to the base assembly, the saw support assembly supporting the saw unit and pivoting the saw unit to plunge the saw blade into a workpiece laying on the base assembly, the saw support assembly rotating relative to the base assembly to adjust the bevel angle of the saw blade;
   a pin having a first end anchored to the saw support assembly and extending from the first end toward the base assembly; and
   a remote actuator for locking together and preventing relative rotation between the saw support assembly and the turntable, the remote actuator operatively connected to the pin at a position opposite the first end;
   wherein when the remote actuator is actuated the pin is tensioned, the tensioned pin pulling the saw support assembly towards the base assembly to help prevent relative rotation of the saw support assembly and the turntable;

wherein the remote actuator is operatively connected to the pin through first and second linkages, the first and second linkages being pivotally mounted to one another.

2. The miter saw of claim 1 wherein actuation of the remote actuator pulls the pin toward the base assembly.

3. The miter saw of claim 1 wherein the remote actuator is a lever pivotally mounted to the base assembly.

4. The miter saw of claim 3 wherein the base assembly comprises the turntable rotatably mounted on a base to rotate about a vertical axis, the lever is pivotally mounted to the turntable, and the saw support assembly is rotatably mounted to the turntable.

5. The miter saw of claim 2 wherein the base assembly comprises the turntable rotatably mounted on a base to rotate about a vertical axis to adjust the miter angle of the miter saw, and the saw support assembly is rotatably mounted to the turntable.

6. The miter saw of claim 5 further comprising a suite of actuators mounted to the front of the turntable for adjusting the position of the saw unit relative to the base wherein each of the actuators is positioned and is actuable by the user's hand with the user's respective arm in the same general position, the suite of actuators including:

the remote actuator; and a miter angle lock actuator wherein actuation thereof causes the turntable to be locked relative to the base so that the miter angle of the saw blade cannot be adjusted.

7. The miter saw of claim 6 wherein the suite of actuators further includes:

a miter angle detent override actuator wherein actuation thereof causes a detent system for assisting in adjusting the saw blade miter angle to a plurality of preset miter angles to be overridden.

8. The miter saw of claim 1 wherein the second linkage is pivotally mounted to the turntable at a first end thereof, the second linkage is pivotally mounted to the first linkage at a second end thereof, and the pin is pivotally mounted to the second linkage at a location between the second linkage's first and second ends.

9. The miter saw according to claim 3 wherein the lever includes a crank eccentrically formed from the lever's pivoting axis and wherein the first linkage is pivotally mounted to the crank.

* * * * *